United States Patent
Klein et al.

(10) Patent No.: US 6,381,460 B1
(45) Date of Patent: Apr. 30, 2002

(54) METHOD AND RADIO COMMUNICATIONS SYSTEM FOR ASSIGNING A FREQUENCY CHANNEL TO A RADIO STATION AND APPROPRIATE RADIO STATION

(75) Inventors: Anja Klein, Berlin; Michael Färber, Wolfratshausen; Christian Lüders, Meschede, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/550,215

(22) Filed: Apr. 17, 2000

Related U.S. Application Data

(63) Continuation of application No. PCT/DE98/02922, filed on Oct. 1, 1998.

(30) Foreign Application Priority Data

Oct. 17, 1997 (DE) .......................................... 197 46 082

(51) Int. Cl.$^7$ ................................................. H04Q 7/20
(52) U.S. Cl. ........................ 455/450; 455/434; 455/509; 455/515
(58) Field of Search ................................ 455/434, 450, 455/509, 515, 517, 446; 370/277, 280, 281

(56) References Cited

U.S. PATENT DOCUMENTS

| 5,398,258 A | * | 3/1995 | Su et al. ...................... 370/277 |
| 5,497,505 A | | 3/1996 | Koohgoli et al. |
| 5,732,076 A | * | 3/1998 | Ketseoglu et al. .......... 370/280 |

FOREIGN PATENT DOCUMENTS

| DE | 19733336 A1 | 2/1999 |
| EP | 0641093 A2 | 3/1995 |
| GB | 2311910 A | 10/1997 |

* cited by examiner

*Primary Examiner*—Nay Maung
*Assistant Examiner*—Quochien B. Vuong
(74) *Attorney, Agent, or Firm*—Herbert L. Lerner; Laurence A. Greenberg; Werner H. Stemer

(57) ABSTRACT

A method is described in which a signaling message is sent from a first radio station to a second radio station. The message contains information relating to both a frequency channel number and a frequency channel bandwidth, each referring to a common standard bandwidth. The signaling message is received by the second radio station, and the signaled frequency channel is used for transmission and reception purposes. The data relating to the frequency channel number and the bandwidth indicate which frequency channel has to be used. In addition the signal includes information about using radio communication systems with a plurality of non-interconnected frequency bands and with bandwidths intended for various applications.

14 Claims, 6 Drawing Sheets

METHOD AND RADIO COMMUNICATIONS SYSTEM FOR ASSIGNING A FREQUENCY CHANNEL TO A RADIO STATION AND APPROPRIATE RADIO STATION

CROSS-REFERENCE TO RELATED APPLICATION

This is a continuation of copending International Application PCT/DE98/02922, filed Oct. 1, 1998, which designated the United States.

BACKGROUND OF THE INVENTION

FIELD OF THE INVENTION

The invention relates to a method and a radio communications system for assigning a frequency channel to a radio station, in particular for radio communications systems which contain a plurality of possibly non-coherent frequency bands and an appropriate radio station.

Published, British Patent Application GB 2 311 910 A describes a method for assigning a frequency channel to a radio station of a radio communications system and to a radio communications system.

In radio communications systems, messages (for example voice, image information or other data) are transmitted using electromagnetic waves. The irradiation of the electromagnetic waves takes place here at carrier frequencies that lie in the frequency band provided for the respective system. In the case of a global system for mobile communication (GSM), the carrier frequencies lie in the region of 900 MHz, 1800 MHz or 1900 MHz, further standards (NMT, IS-95, etc.) using in turn identical or additional frequency bands. For future radio communications systems, for example the universal mobile telecommunication system (UMTS) or other 3rd generation systems, frequencies in the frequency band of approximately 2000 MHz are provided.

Between a transmitting and a receiving radio station there is a radio interface over which a data transmission takes place using the electromagnetic waves. Published, Non-Prosecuted German Patent Application DE 197 33 336 A1 discloses a radio communications system which uses a CDMA subscriber separation (CDMA Code Division Multiple Access), the radio interface additionally having a time division multiple subscriber separation (TDMA Time Division Multiple Access). At the receiving end, a joint detection (JD) method is applied in order to perform improved detection of the transmitted data with spread codes of a plurality of subscribers being known.

From the GSM mobile radio network it is known that a number is transmitted from a base station to the mobile station in order to assign a frequency channel to a mobile station, the number designating, as a multiple of the fixed standard bandwidth of 200 kHz, the frequency channel which is to be selected in the uplink direction, for example for GSM900 the numbers 0 . . . 123 within the frequency band from 890–915 MHz. This numbering is valid only for this frequency band and for the GSM1800 frequency band with numbers 512 . . . 885; in other GSM frequency bands, for example for PCS1900 or for mobile radio networks with other transmission methods the numbering scheme is not unambiguous, or is defined in other ways in other standards.

This leads to ambiguities in multi-mode mobile radio stations or in future third generation mobile radio stations because a plurality of frequency bands are available and possibly different bandwidths of the frequency channels are made available.

SUMMARY OF THE INVENTION

It is accordingly an object of the invention to provide a method and a radio communications system for assigning a frequency channel to a radio station and an appropriate radio station that overcome the above-mentioned disadvantages of the prior art devices and methods of this general type, which simplify the assignment of a frequency channel to a mobile station.

With the foregoing and other objects in view there is provided, in accordance with the invention, a method for assigning a frequency channel to a radio station of a radio communications system, which includes:

transmitting a signaling message from a first radio station to a second radio station, the signaling message containing a number of the frequency channel for defining a signaled frequency channel and information relating to a bandwidth of the frequency channel, the number of the frequency channel and the information relating to the bandwidth of the frequency channel refer to a common standard bandwidth, and both the number of the frequency channel and the information relating to the bandwidth are contained, in a form of multipliers of the common standard bandwidth in the signaling message;

receiving the signaling message in the second radio station; and the second radio station using the signaled frequency channel for transmission and reception purposes.

In the method according to the invention for assigning the frequency channel to the radio station of a radio communications system, the signaling message is transmitted from the first radio station to the second radio station. The signaling message contains information relating to the number of the frequency channel and to the bandwidth of the frequency channel, and both the number of the frequency channel and the bandwidth of the frequency channel refer to a common standard bandwidth. The signaling message is received by the second radio station and the signaled frequency channel is used for transmission and/or reception purposes. The data relating to the number and to the bandwidth of the frequency channel unambiguously indicate the frequency channel to be used, even in the case of radio communications systems having a plurality of non-coherent frequency bands. Any desired transmission method may be used in the individual frequency bands here. A further advantage consists in the fact that it is not necessary to start from a single bandwidth that has been defined in advance, but rather the bandwidth can be assigned and signaled after an appropriate request. The assignment is thus significantly more flexible.

According to one advantageous refinement, the bandwidth is equal to the standard bandwidth or a multiple thereof. This simplifies the signaling because the bandwidth can be signaled by an integer that is to be multiplied by the standard bandwidth. According to a further embodiment of the invention, the second radio station selects the standard bandwidth as the bandwidth to be used if the information relating to the bandwidth is not present in the signaling message. This is significant in particular for downlink compatibility between components of different generations of radio communications systems. Thus, for example a base station of a GSM mobile radio network can continue to transmit a number which indicates only the number of the frequency band, which number is also processed by mobile stations which expect frequency channel assignments according to the invention. The scheme according to the invention can therefore be implemented in existing signaling mechanisms.

According to a further advantageous refinement of the invention, the number indicates the frequency channel whose distance from a reference channel is equal to the standard bandwidth or a multiple thereof. It is thus possible to restrict the signaling to integers that, once multiplied by the standard bandwidth and provided with the reference frequency as an offset, unambiguously describe the frequency channel.

The number here indicates the start (lowest or highest frequency) of the frequency channel or the center of the frequency channel. The reference frequency can additionally be signaled, but it is advantageously defined and stored in both radio stations. Further signaling complexity is thus eliminated. The numbering of a frequency band does not need to start at zero here, but instead predefinable number ranges can advantageously also be assigned to individual frequency ranges.

There are a plurality of possible ways of defining the standard bandwidth. If a migration from the GSM mobile radio network is aimed at, the standard bandwidth is advantageously equal to 200 kHz. If further networks that use a relatively small bandwidth of the frequency channels are to be included, it is advantageous if the standard bandwidth is equal to the smallest of the carrier bandwidths of the different radio communications networks. If the different bandwidths that are to be used cannot be related back to a minimum common divisor, the standard bandwidth is equal to the most frequently expected bandwidth. The signaling is thus simplest for these most frequently occurring cases. Alternatively, the bandwidth can also be signaled as a selection from a plurality of available bandwidths. If only a few bandwidths are available for selection, only a small number of bits are necessary for signaling.

Other features which are considered as characteristic for the invention are set forth in the appended claims.

Although the invention is illustrated and described herein as embodied in a method and a radio communications system for assigning a frequency channel to a radio station and an appropriate radio station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
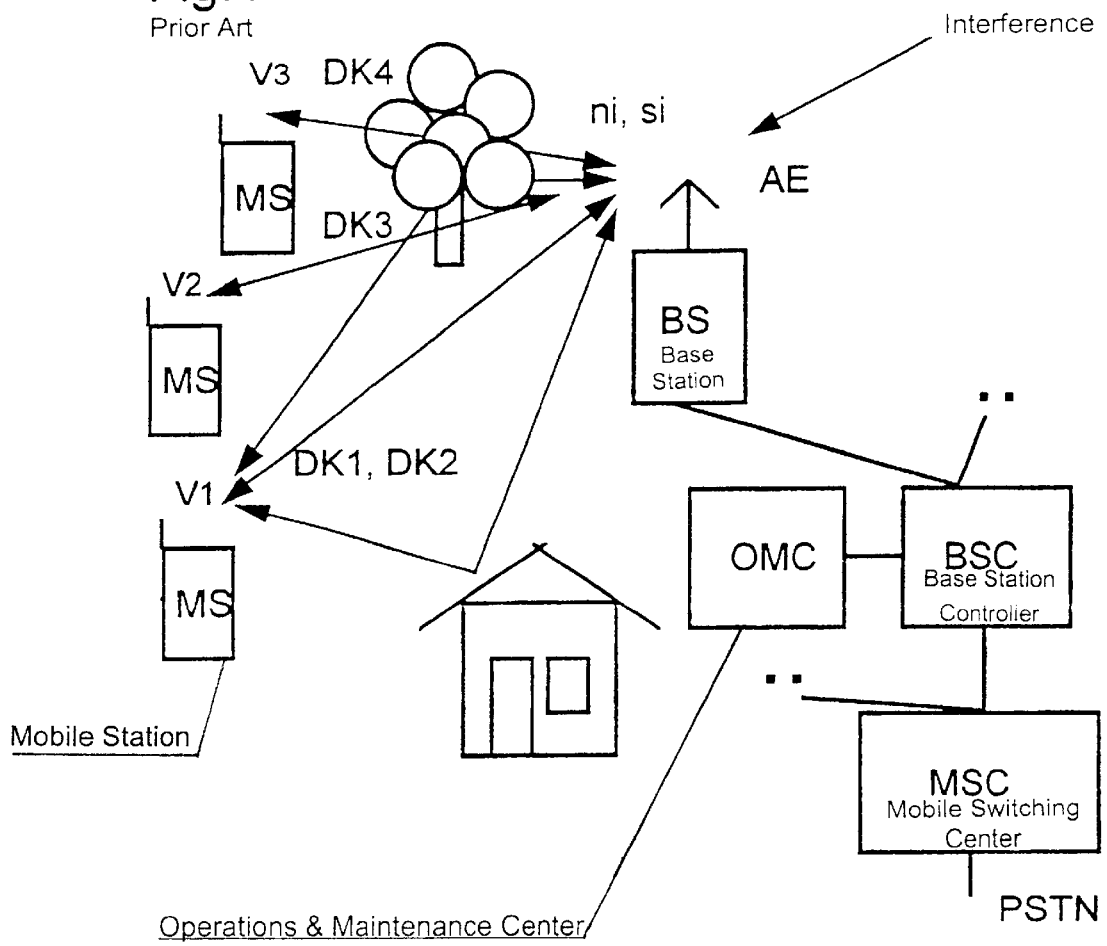
FIG. 1 is a block diagram of a mobile radio network.

In all the figures of the drawing, sub-features and integral parts that correspond to one another bear the same reference symbol in each case. Referring now to the figures of the drawing in detail and first, particularly, to FIG. 1 thereof, there is shown a radio communications system that corresponds in its structure to a known GSM mobile radio network which is composed of a multiplicity of mobile switching centers MSC which are networked to one another and/or provide access to a fixed network PSTN. In addition, the mobile switching centers MSC are connected to, in each case, at least one base station controller BSC. Each base station controller BSC makes possible, in turn, a connection to at least one base station BS. Such a base station ES is a radio station which can set up a radio link to mobile stations MS via a radio interface.

In FIG. 1, three radio links V1 . . . V3 for transmitting useful information ni and signaling information si between three mobile stations MS and the base station BS are illustrated by way of example. One of the mobile stations MS is assigned two data channels DK1 and DK2, and the other of the mobile stations MS are each assigned one data channel DK3 or DK4. An operations and maintenance center OMC carries out control and maintenance functions for the mobile radio network and/or for parts thereof. The functionality of this structure is used by the radio communications system according to the invention; however, it can also be transferred to other radio communications systems in which the invention can be used.

The base station BS is connected to an antenna device AE that is composed, for example, of three individual radiators. Each of the individual radiators radiates directionally into a sector of a radio cell supplied by the base station BS. However, alternatively a relatively large number of individual radiators (in accordance with adaptive antennas) can also be used with the result that a spatial subscriber separation according to a space division multiple access (SDMA) method can also be used.

The base station BS provides the mobile stations MS with organizational information relating to a location area (LA) and the radio cell (radio cell identifier). The organizational information is irradiated simultaneously over all the individual radiators of the antenna device.

The links V1 . . . V3 with the useful information ni and the signaling information si between the base station BS and the mobile stations MS are subject to multi-path propagation which is caused by reflections, for example on buildings, in addition to the direct propagation path. If it is assumed that the mobile stations MS move, the multi-path propagation, together with further interference, causes the signaling components of the various propagation paths of a subscriber signal to become superposed as a function of time at the receiving mobile station MS. In addition, it is assumed that the subscriber signals from different base stations BS are superposed at the reception location to form a reception signal rx in a frequency channel.

So that the links V1 . . . V3 with the useful information ni and the signaling information si can be set up and maintained, it is necessary to assign a frequency channel. The frequency channel is designated below only by the carrier frequency to be used and a bandwidth. An assignment of a time slot and/or of a CDMA code is not separately described here. The signaling for the assignment of frequency channels is also used by handover messages and by a notification of frequency channels in the sense of organizational information.

Figure 2:
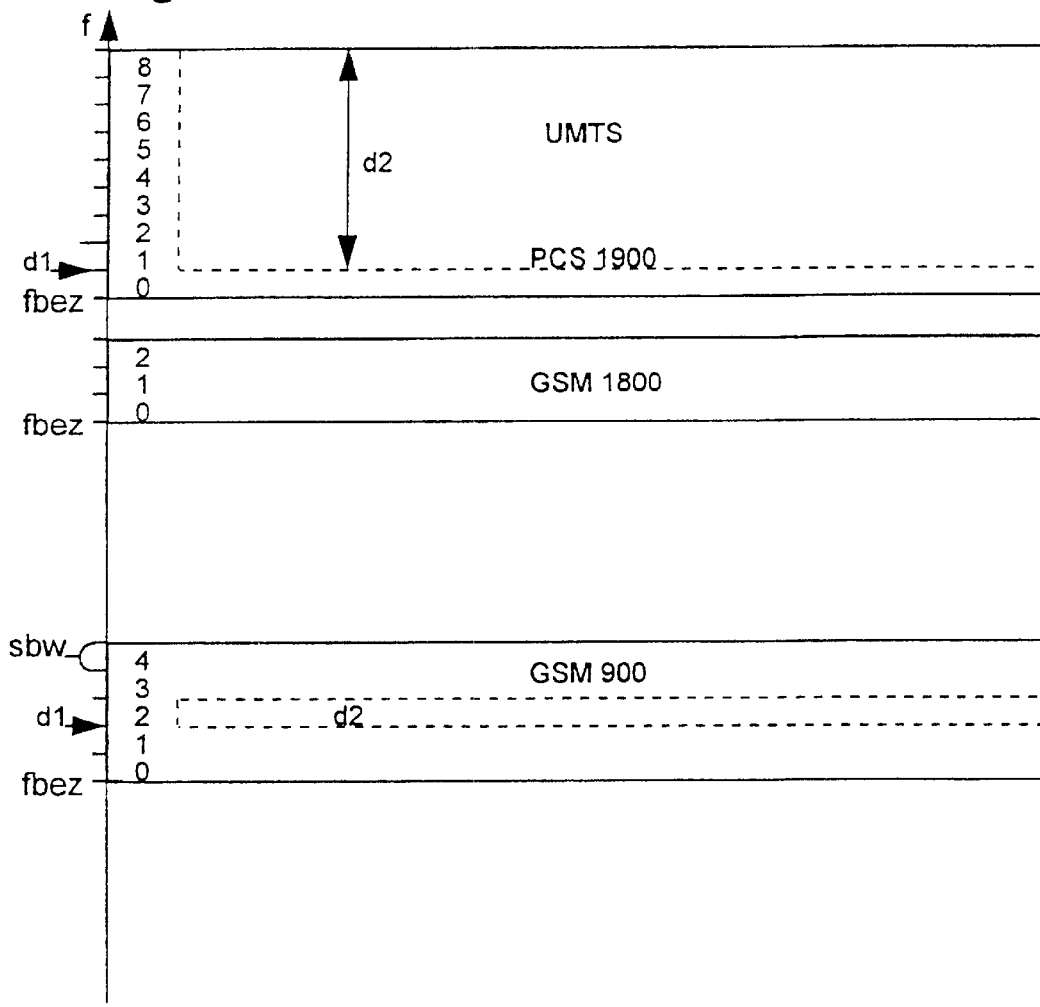
FIGS. 2–4 are illustrations of subdivisions of frequency bands of a radio communications system according to the invention.
Figure 3:
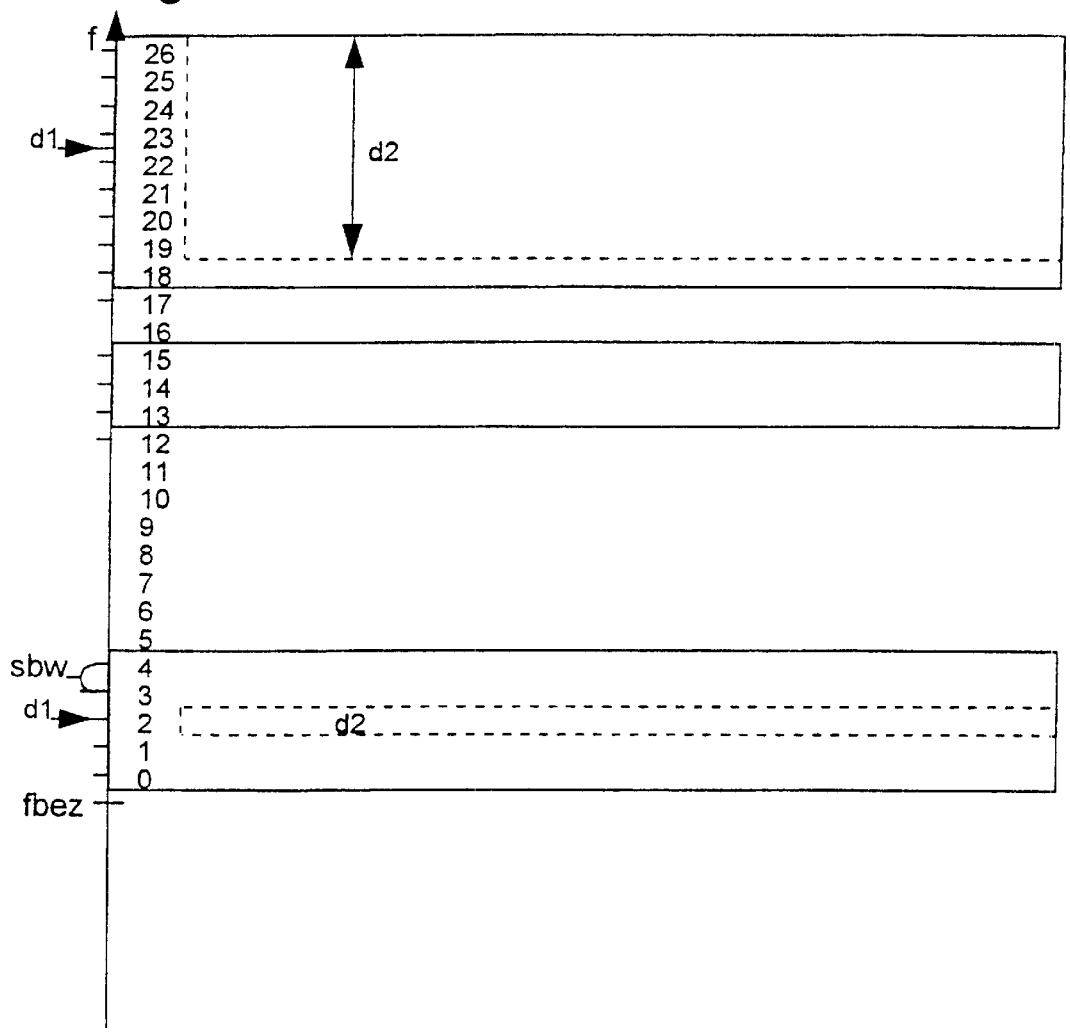
Figure 4:
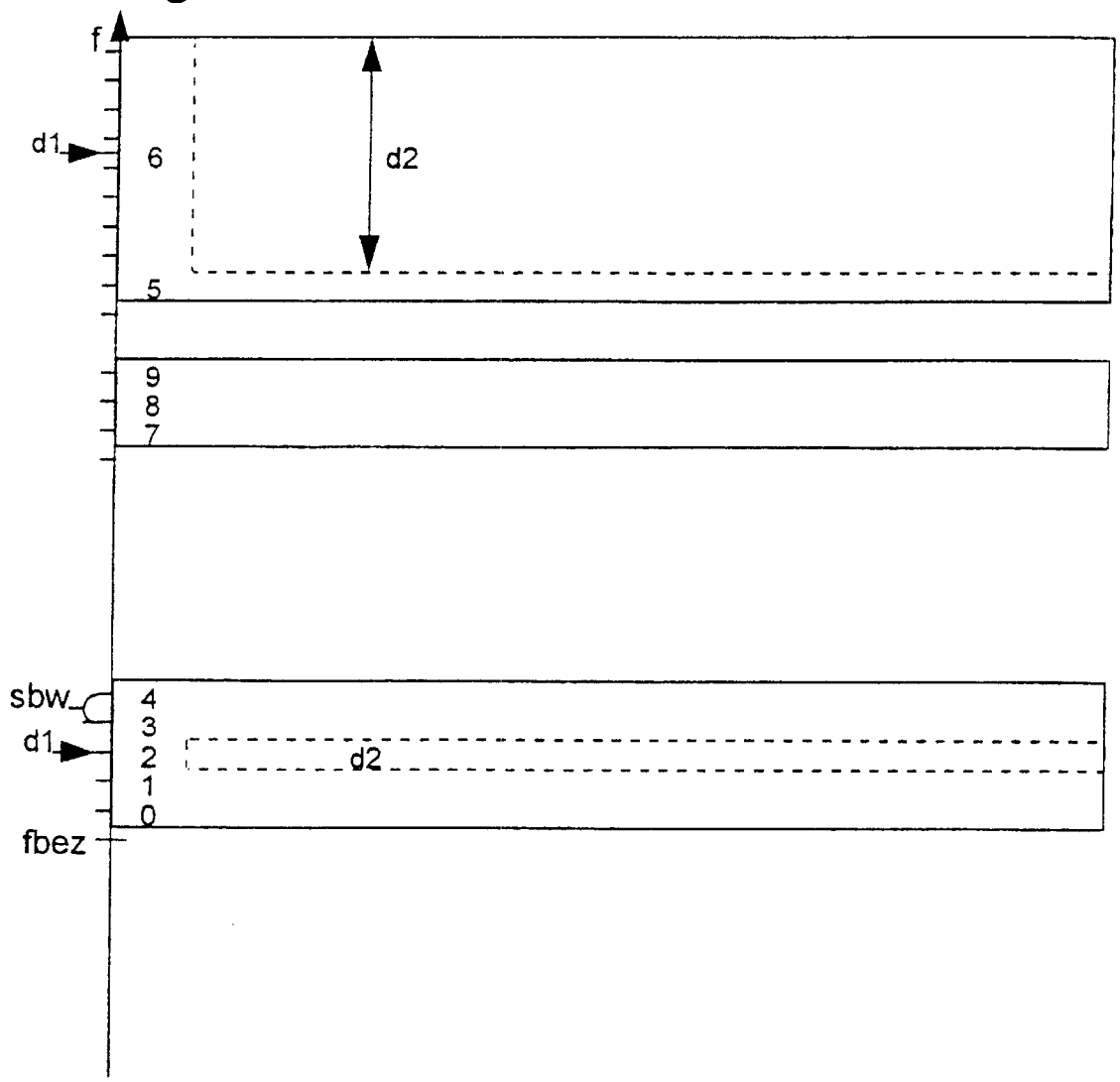

The frequency channel is taken from a frequency spectrum according to FIG. 2 to FIG. 4. In the figures, a plurality of frequency bands which are used by the radio communications system are given. These frequency bands are not coherent; coherent frequency bands can also be represented by the invention. It is to be noted that the different frequency bands do not necessarily have to be allocated to one mobile radio network or one standard. Any desired assignments are possible. In the exemplary embodiments, reference is made to a solution that contains the frequency bands of GSM 900, GSM1800, PCS1900 and UMTS.

A standard bandwidth sbw is defined at 200 kHz which corresponds to the defined bandwidth of the GSM mobile radio standard. In addition, a reference frequency fbez which corresponds in FIG. 2 to the smallest frequency that can be used in each frequency band is defined. Within the frequency bands that can be used, the frequency channels are numbered consecutively in 200 kHz increments. Two specific frequency channels are highlighted in FIG. 2. A first frequency channel lies in the GSM 900 band. It has a bandwidth d2 of 200 kHz and the number d1=2. A second frequency channel lies in the UMTS band with a bandwidth of d2=8 times 200 kHz, starting with the number d1=1. The number d1 of the frequency channels indicates here the lowest frequency of the frequency channel.

In FIG. 3 there is consecutive numbering of all the frequency channels, including the unusable gaps between the frequency bands. In addition, this solution differs in that the reference frequency fbez designates a center of a frequency band with the standard bandwidth sbw. Two frequency channels are highlighted again. However, the number d1 of the frequency channel indicates the center frequency of the frequency channel here.

In FIG. 4 the frequency channels are numbered in such a way that the gaps are excluded and the allocation of numbers is oriented according to existing radio mobile networks, see GSM900 and GSM1800, i.e. gaps in the existing numbering system are used. Here, the number d1 of the frequency channel can also unambiguously define its bandwidth d2. For example, the numbers d1=0 to 5 and 7 to 9 imply a bandwidth of d2=200 kHz, and the number d1=6 implies a bandwidth of d2=1.6 MHz.

Figure 5:
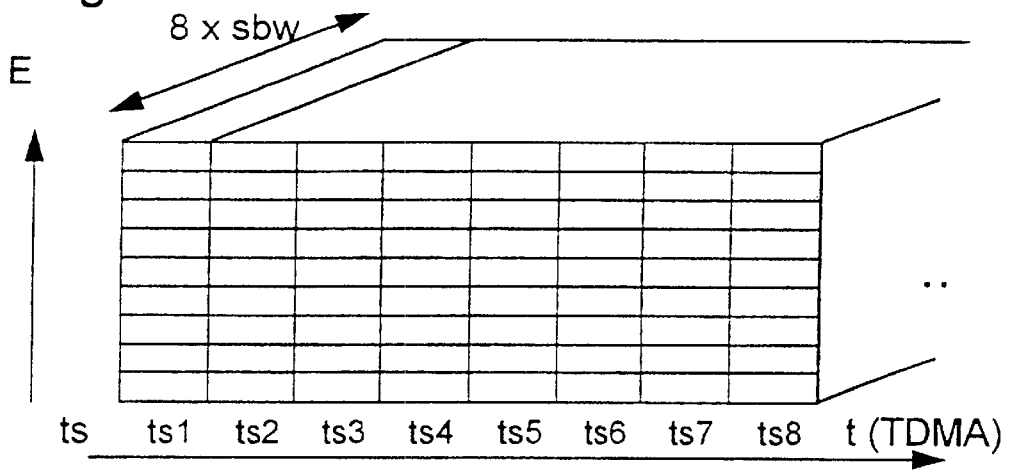
FIG. 5 is a schematic representation of a frame structure of a radio interface.

The frame structure of the radio interface for a FDMA/TDMA/CDMA transmission method for which the invention can be used particularly advantageously can be seen in FIG. 5. According to a TDMA component, there is provision for a broadband frequency range, for example the bandwidth 8×sbw=1.6 MHz, to be divided into a plurality of time slots ts, for example eight time slots ts1 to ts8. Within the frequency channels that are provided for transmitting useful data, information from a plurality of links is transmitted in radio blocks. According to a frequency division multiple access (FDMA) component, a plurality of frequency ranges are assigned to the radio communications system.

Figure 6:
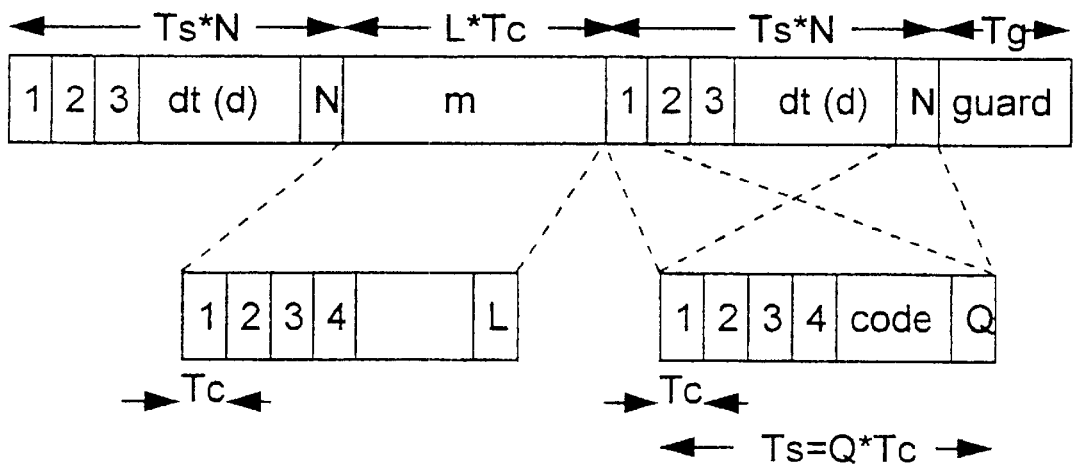
FIGS. 6 is a schematic representation of a structure of a radio block.

According to FIG. 6, the radio blocks for transmitting useful data are composed of data components with data symbols d in which sections with midambles m which are known at the receiving end are embedded. The data d are spread on a connection-specific basis with a fine structure, which is a spread code, with the result that at the receiving end it is possible to separate, for example, K data channels DK1, DK2, DK3, . . . DKK by use of this CDMA component. Each of the data channels DK1, DK2, DK3, . . . DKK is assigned, at the transmit end, a specific energy value E per symbol.

The spreading of individual symbols of the data d with Q chips has the effect that Q subsections of a duration Tc are transmitted within the symbol duration Ts. The Q chips form the individual spread code here. The midamble m is composed of L chips, also of the duration Tc. In addition, a guard time guard of a duration Tg for compensating different signal propagation times of the links of successive time slots ts is provided within the time slot ts. This structure of the radio interface has the advantage that a link can also be assigned a plurality of data channels without a large amount of effort. The midambles m within the radio blocks permit channel estimation, as is known from TDMA systems.

Within a broadband frequency range, the successive time slots ts are divided up according to a frame structure. Thus, eight time slots ts are combined to form one frame, a specific time slot of the frame forming a frequency channel for transmitting useful data and being used in the opposite direction by a group of links. Further frequency channels, for example for frequency synchronization or time synchronization of the mobile stations MS are not introduced in each frame, but rather introduced at a predefined point in time within a multi-frame. The distances between these frequency channels determine the capacity that the radio communications system makes available for them.

The parameters of the radio interface, are for example, as follows:

| | |
|---|---|
| Duration of a radio block | 577 $\mu$s |
| Number of chips per midamble m | 243 |
| Guard time Tg | 32 $\mu$s |
| Data symbols per data component N | 33 |
| Symbol duration Ts | 6.46 $\mu$s |
| Chips per symbol Q | 14 |
| Chip duratian Tc | 6/13 $\mu$s |

The parameters can also be set differently in the uplink direction (MS to BS) and the downlink direction (BS to MS).

The assignment of the frequency channel is carried out by a signaling message sig1. The signaling message sig1 according to FIG. 7a contains two data components d1 and d2, d1 specifying the number for the frequency channel and d2 specifying the bandwidth as an integral multiple of the standard bandwidth sbw. The radio station which receives the signaling message sig1 selects the standard bandwidth sbw as the bandwidth to be used, if the information relating to the bandwidth is not present in the signaling message or an invalid value has been transmitted.

Figure 8:
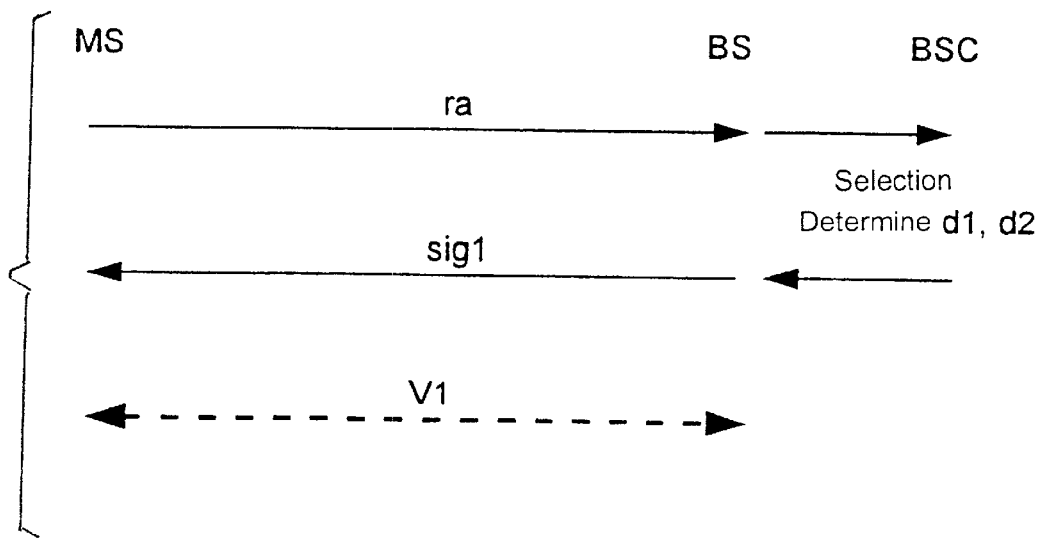
FIG. 8 is a flow chart of a process of an assignment of a frequency channel.

An exchange of messages between the participating components of the radio communications system can be seen in FIG. 8. After the organizational information, which also contains data relating to the frequency channel used for a channel assignment request, has been received, the mobile station MS can transmit, as the first radio station in a radio cell, a message ra (random access) for the assignment of radio resources, which message ra is received by the base station BS and forwarded to the base station controller BSC. The base station controller BSC, as the device for assigning a frequency channel to a radio station, evaluates this message ra. The message ra contains data relating to the frequency bands which can be evaluated by the mobile station MS, and relating to the requested bandwidth or the requested service, with the result that the base station controller BSC assigns a frequency band, in compliance with these requests and with the current capacity utilization of the available frequency bands in the radio cell. In this way the number d1 and the bandwidth d2 for the frequency channel are defined.

The data d1, d2 relating to the base station BS are transmitted to the mobile station MS by the signaling message sig1. After the signaling message sig1 has been received, the mobile station MS, as the second radio station, uses the signaled frequency channel for further radio traffic within the link V1 for transmission and/or with offset for reception.

An exchange of messages between the participating components of the radio communications system can be seen in FIG. 8. After the organizational information, which also contains data relating to the frequency channel used for a channel assignment request, has been received, the mobile station MS can transmit, as the first radio station in the radio cell, the message ra (random access) for the assignment of radio resources, which message ra is received by the base station BS and forwarded to the base station controller BSC. The base station controller BSC, as the device for assigning the frequency channel to the radio station, evaluates the message ra. The message ac contains data relating to the frequency bands which can be evaluated by the mobile station MS, and relating to the requested bandwidth or the requested service, with the result that the base station controller BSC assigns a frequency band, in compliance with these requests and with the current capacity utilization of the available frequency bands in the radio cell. In this way the number d1 and the bandwidth d2 for the frequency channel are defined.

The data d1, d2 relating to the base station BS are transmitted to the mobile station MS by the signaling message sig1. After the signaling message sig1 has been received, the mobile station MS, as the second radio station, uses the signaled frequency channel for the further radio traffic within the link V1 for transmission and/or with offset for reception.

Figure 7:
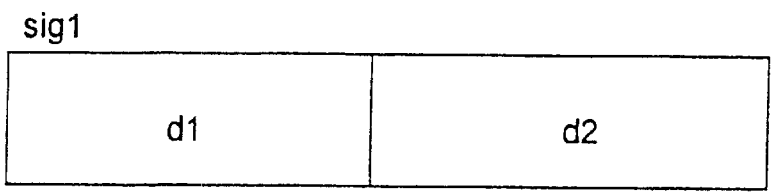
FIGS. 7a–7d are block illustrations of structures of a signaling message.
Figure 7:
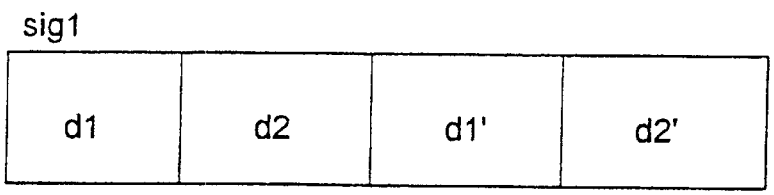
Figure 7:
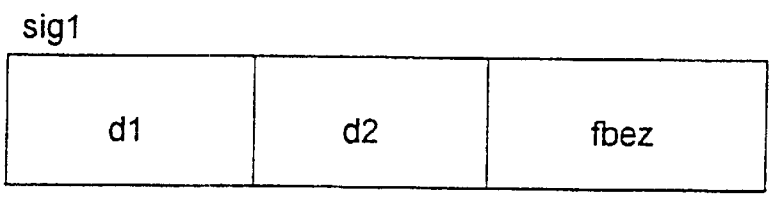
Figure 7:
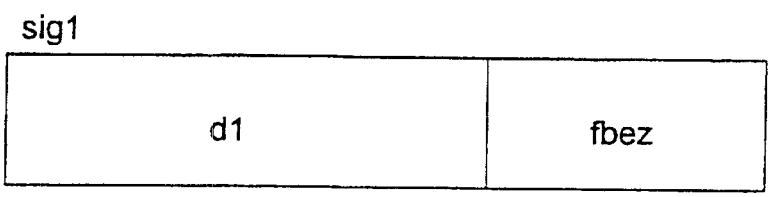

It is to be noted here that the signaling message sig1 contains either just one pair of values d1 and d2, so that the offset is permanently defined for the opposite transmission direction as in the GSM mobile radio system. However, it is possible as an alternative (FIG. 7b), also to signal separate values d1, d2 and d1', d2' for both transmission directions. If, as in FIG. 2, there is no consecutive numbering even between the frequency bands, the signaling message sig1 also contains data relating to the reference frequency fbez (FIG. 7c).

A further possibility consists in assigning a frequency channel just by the number d1 (FIG. 7d), in such a way that the bandwidth d2 of the frequency channel is defined (see FIG. 4). The data field of the reference frequency fbez is used here to signal the new assignment method within a known GSM message. The signaling messages sig1 can also be integrated within 10 bits of the known GSM messages.

The mobile radio network which is presented in the exemplary embodiments and which has a combination of FDMA, TDMA and CDMA is suitable for requirements made of the 3rd generation systems. In particular, it is suitable for implementation in existing GSM mobile radio networks for which only a small degree of modification work is necessary. The assignment of frequency channels can be based on existing signaling mechanisms and can at the same time be compatible with the requirements made of a wide variety of the 3rd generation radio communications systems.

We claim:

1. A method for assigning a frequency channel to a radio station of a radio communications system, which comprises:
    transmitting a signaling message from a first radio station to a second radio station, the signaling message containing a number of the frequency channel for defining a signaled frequency channel and information relating to a bandwidth of the frequency channel, the number of the frequency channel and the information relating to the bandwidth of the frequency channel refer to a common standard bandwidth, and both the number of the frequency channel and the information relating to the bandwidth are contained, in a form of multipliers of the common standard bandwidth in the signaling message;
    receiving the signaling message in the second radio station; and
    the second radio station using the signaled frequency channel for transmission and reception purposes.

2. The method according to claim 1, which comprises setting the bandwidth to be equal to the common standard bandwidth.

3. The method according to claim 1, which comprises using the number to indicate the frequency channel whose distance from a reference frequency is equal to one of the common standard bandwidth and a multiple thereof.

4. The method according to claim 3, which comprises wherein a start, being one of a lowest frequency and a highest frequency, of the frequency channel, is indicated by the number.

5. The method according to claim 3, wherein a center of the frequency channel is indicated by the number.

6. The method according to claim 1, which comprises defining a reference frequency in both the first radio station and the second radio station.

7. The method according to claim 1, which comprises setting the common standard bandwidth to 200 kHz.

8. The method according to claim 1, which comprises setting the common standard bandwidth to a most frequently expected bandwidth.

9. The method according to claim 1, which comprises setting the common standard bandwidth equal to a smallest of carrier bandwidths of different radio communications networks.

10. The method according to claim 1, which comprises setting the bandwidth to be a multiple of the common standard bandwidth.

11. A radio communications system, comprising:
    a device for assigning a frequency channel to a radio station;
    a first radio station which, under control of said device, transmits a signaling message containing a number of the frequency channel and information relating to a bandwidth of the frequency channel, the number of the frequency channel and the information relating to the bandwidth of the frequency channel refer to a common standard bandwidth, so that both the number and the information relating to the bandwidth being contained, in a form of multipliers of the common standard bandwidth, in the signaling message; and
    a second radio station for receiving the signaling message and for using the frequency channel assigned for transmitting and receiving purposes.

12. The radio communications system according to claim 11, wherein frequency bands which are not to be used are disposed between frequency channels which are available to said first radio station and said second radio station.

13. The radio communications system according to claim 11, wherein frequency channels which are available to said first radio station and said second radio station contain at least parts of frequency bands of a global system for mobile communication mobile radio network.

14. A radio station for a radio communications system, the radio station comprising:
- a device for assigning a frequency channel to a radio station;
- a radio station which, under control of said device, transmits a signaling message containing a number of the frequency channel and information relating to a bandwidth of the frequency channel, the number of the frequency channel and the information relating to the bandwidth of the frequency channel refer to a common standard bandwidth, so that both the number and the information relating to the bandwidth being contained, in a form of multipliers of the common standard bandwidth, in the signaling message; and
- a mobile station for receiving a signaling message and for using an assigned frequency channel for transmitting and receiving, said mobile station selects a standard bandwidth as a bandwidth to be used if information relating to the bandwidth is not present in the signaling message.

* * * * *